(12) United States Patent
Girod et al.

(10) Patent No.: US 9,193,478 B2
(45) Date of Patent: Nov. 24, 2015

(54) FLIGHT RECORDER, AIRCRAFT WITH FLIGHT RECORDER AND METHOD FOR READING OUT FLIGHT DATA FROM A FLIGHT RECORDER

(71) Applicant: AIRBUS OPERATIONS GMBH, Hamburg (DE)

(72) Inventors: Maurice Girod, Hamburg (DE); Uwe Bartels, Norderstedt (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 14/219,829

(22) Filed: Mar. 19, 2014

(65) Prior Publication Data
US 2014/0297101 A1 Oct. 2, 2014

(30) Foreign Application Priority Data

Mar. 21, 2013 (DE) .......... 10 2013 205 004

(51) Int. Cl.
*B64D 45/00* (2006.01)
*G07C 5/00* (2006.01)

(52) U.S. Cl.
CPC ............. *B64D 45/00* (2013.01); *G07C 5/008* (2013.01); *B64D 2045/0065* (2013.01)

(58) Field of Classification Search
CPC ........ B64D 43/00; B64D 43/02; B64D 45/00; B64D 2045/0065; G07C 5/008
USPC ................. 701/33.4, 400, 408, 540
See application file for complete search history.

(56) References Cited

U.S. PATENT DOCUMENTS

| | | | |
|---|---|---|---|
| 5,467,274 A * | 11/1995 | Vax ................... | 701/14 |
| 6,058,071 A | 5/2000 | Woodall et al. | |
| 6,264,135 B1 * | 7/2001 | Dacosta ................ | 244/1 R |
| 6,898,492 B2 | 5/2005 | De Leon et al. | |
| 8,005,584 B1 | 8/2011 | Flynn | |
| 2004/0230352 A1 | 11/2004 | Monroe | |
| 2005/0017876 A1 * | 1/2005 | Ziarno ................ | 340/945 |
| 2012/0300761 A1 * | 11/2012 | Vasko et al. ............ | 370/338 |
| 2012/0310487 A1 * | 12/2012 | Thomas et al. ......... | 701/49 |

FOREIGN PATENT DOCUMENTS

| | | |
|---|---|---|
| DE | 198 30 685 A1 | 7/1998 |
| DE | 10 2010 053 614 A1 | 6/2012 |
| WO | WO 2009/137745 A2 | 11/2009 |

OTHER PUBLICATIONS

German Search Report for Application No. 10 2013 205 004.6 dated May 10, 2013.

* cited by examiner

*Primary Examiner* — Jerrah Edwards
*Assistant Examiner* — Tamara Weber
(74) *Attorney, Agent, or Firm* — Jenkins, Wilson, Taylor & Hunt, P.A.

(57) ABSTRACT

The present disclosure relates to a flight recorder, having a memory, a control device, which is coupled to the memory and which is configured to record flight data during the flight of an aircraft and to store said flight data in the memory, a transceiver device, which is coupled to the control device and which is configured to accept stored flight data signals from the control device and to convert them into acoustic signals, and an acoustic transducer, which is coupled to the transceiver device and which is configured to emit the acoustic signals of the transceiver device into a body of water, the control device being configured to receive control signals via the transceiver device and, depending on the control signals, to retrieve partial data areas of the stored flight data from the memory and to transfer them to the transceiver device.

14 Claims, 2 Drawing Sheets

FLIGHT RECORDER, AIRCRAFT WITH FLIGHT RECORDER AND METHOD FOR READING OUT FLIGHT DATA FROM A FLIGHT RECORDER

CROSS-REFERENCE TO RELATED APPLICATION

This application claims the benefit of and priority to German patent application No. 10 2013 205 004.6 filed Mar. 21, 2013, the entire disclosure of which is herein incorporated by reference.

TECHNICAL FIELD

The present invention relates to a flight recorder, an aircraft having a flight recorder and a method for reading out flight data from a flight recorder, in particular in flight recorders suitable for being underwater.

BACKGROUND

According to the current standard, flight recorders are generally rigidly connected to the aircraft, the flight data of which is to be recorded. In the case of a crash over bodies of water, these flight recorders sink together with the aircraft wreck to the bottom of the body of water. In order to recover the flight recorders, considerable efforts and a great deal of time are sometimes necessary, in particular in the case of deep bodies of water such as oceans.

To help in locating the flight recorders, underwater locating apparatuses can be used, which can periodically emit locating signals, which can be received and evaluated by locating systems such as locating ships, buoys or locating aircraft to simplify and accelerate the finding of the flight recorder.

U.S. Pat. No. 6,898,492 B2 discloses, for example, a flight data recording apparatus of this type that is suitable for underwater, can record flight data and can transmit locating signals by means of an ultrasonic transducer after an aircraft crash below water.

In order to reach the flight data more quickly and more reliably, it may be possible to install communications devices in the flight recorder, which communications devices, even in the damaged state, can emit flight data from the bottom of the body of water for reception by a receiving system.

U.S. Pat. No. 8,005,584 B1 discloses, for example, a flight data collection system of this type, from which flight data can be read out via of a communications system, when it is located underwater after aircraft damage.

However, there is a need for improved flight recorders and methods for communicating therewith, which provide a lower implementation outlay and extended communications possibilities with the flight recorder.

SUMMARY

One idea of the invention is therefore to provide a flight recorder, an aircraft having a flight recorder and a method for reading out flight data from a flight recorder, with which the installation space, weight and implementation outlay for the flight recorder can be reduced.

According to a first aspect of the disclosure a flight recorder has a memory, a control device, which is coupled to the memory and which is configured to record flight data during the flight of an aircraft and to store said flight data in the memory, a transceiver device, which is coupled to the control device and which is configured to accept stored flight data signals from the control device and to convert them into acoustic signals, and an acoustic transducer, which is coupled to the transceiver device and which is configured to emit the acoustic signals of the transceiver device into a body of water. In this case, the control device is configured to receive control signals via the transceiver device and, depending on the control signals, to retrieve partial data areas of the stored flight data from the memory and to transfer them to the transceiver device.

Furthermore, according to a second aspect of the disclosure an aircraft has a flight recorder according to the first aspect of the disclosure.

According to a third aspect, the disclosure furthermore provides a method for reading out flight data from a flight recorder, having the steps of recording flight data during the flight of the aircraft and storing the flight data in a memory of a flight recorder, receiving a control signal, which activates a control device of the flight recorder to output a selected partial data area of the stored flight data, outputting the selected partial data area of the stored flight data by means of the control device to a transceiver device as a flight data signal, converting the received flight data signal by means of the transceiver device into acoustic signals, and outputting the converted acoustic signals of the transceiver device into a body of water.

One of the ideas of the present disclosure is to reduce the energy consumption of the flight recorder and its components, in that after an aircraft crash over a body of water, the outward transmission of the flight data stored in the flight recorder can be controlled by targeted control commands of a read-out system. As a result, only specific parts of the stored flight data that are of particular interest for the evaluation of the aircraft crash are communicated outwardly by the flight recorder.

This has the advantage that the time taken for the data transmission to the read-out system can be substantially reduced, as not all flight data but only a selected fraction has to be transmitted. This in turn substantially reduces the energy requirement for the transmission. Thus, on the one hand, the energy supply, for example a battery or an accumulator, can be configured in a substantially more space-saving manner and more economically in the flight recorder. On the other hand, with the same energy supply power in the flight recorder, the possibility of communicating from a greater depth of the body of water or for a longer time period can be ensured, which simplifies the reading out of the flight data from the flight recorder.

According to one embodiment of the flight recorder according to the invention, the flight recorder furthermore comprises a flight data collector, which is configured to collect operating parameters of the aircraft during the flight and to transfer them to the control device.

According to a further embodiment of the flight recorder according to the invention, the flight recorder furthermore comprises a media collecting apparatus, which is configured to collect media recordings during the flight of the aircraft and to transfer them to the control device.

According to a further embodiment of the flight recorder according to the invention, the memory has a database structure, which is configured to store the flight data in structured form.

According to a further embodiment of the flight recorder according to the invention, the control device is configured to be operated in an energy-saving state, until a control signal puts the control device into a normal operating state, the control device being configured to transfer flight data signals to the transceiver device only in the normal operating state.

According to a further embodiment of the flight recorder according to the invention, the flight recorder furthermore comprises an electrical energy supply source, which is configured to supply the control device, the transceiver device and/or the acoustic transducer with electrical energy.

According to one embodiment of the aircraft according to the invention, the aircraft has an undercarriage housing, which is used as a housing for the flight recorder.

According to an alternative embodiment of the aircraft according to the invention, the aircraft has an engine mounting, which is used as a housing for the flight recorder.

Obviously, other structural components of the aircraft may also be used as a housing for the flight recorder according to further embodiments. All structural components are possible here that have the necessary mechanical stability, heat resistance and water pressure resistance.

According to one embodiment of the method according to the invention, the method furthermore has the step of receiving the converted acoustic signals by means of a data read-out system located in the body of water.

According to a further embodiment of the method according to the invention, the data read-out system may be incorporated in an underwater vehicle, in the part of the ship located underwater or in a part of a floating buoy located underwater.

According to a further embodiment of the method according to the invention, the floating buoy may have a communications device for forwarding the flight data received by the data read-out system to a satellite communications system.

According to a further embodiment of the method according to the invention, the control device may be operated in an energy-saving state, until a control signal puts the control device into a normal operating state. The control device can preferably output flight data signals to the transceiver device only in the normal operating state. This has the advantage that battery power can be saved within the flight recorder, so either the energy supply source can be implemented in reduced form or the flight recorder is in a position over a relatively long time period to transmit flight data to a data read-out system.

BRIEF DESCRIPTION OF THE DRAWINGS

The invention will be described more precisely below in conjunction with and in relation to the exemplary embodiments as in the accompanying drawings.

The accompanying drawings are used for better understanding of the present invention and illustrate exemplary embodiment variants of the invention. They are used to describe principles, advantages, technical effects and variation possibilities. Obviously, other embodiments and many of the intended advantages of the invention are likewise conceivable, in particular while viewing the detailed description of the invention shown below. The elements in the drawings are not necessarily shown true to scale and are partly shown simplified or schematically for reasons of clarity. The same reference numerals designate the same or similar components or elements here.

DETAILED DESCRIPTION

Although special embodiments are described and shown here, it is clear to the person skilled in the art that a wealth of further, alternative and/or equivalent implementations can be selected for the embodiments, without substantially deviating from the basic ideas of the present invention. Generally, all variations and modifications of the embodiments described here are also considered to be covered by the invention.

Flight recorders in the sense of the present disclosure designate all the recording apparatuses carried in an aircraft or other means of air transportation, which store with a time axis both relevant flight and aircraft parameters and image and sound recordings during a flight. Flight recorders of this type are designed in such a way that they can withstand high impact loads, high temperatures and temperature fluctuations, high water pressure and the action of fire.

Flight data in the sense of the present disclosure designate all the storable information units, which, after a flight accident, such as an aircraft crash, provide possibilities for reconstructing the course of the accident and for tracking events, operating parameters and/or conditions relevant to the accident or crash that allow the course of the accident to be understood more precisely. In this case, flight data in the sense of the present disclosure may include, for example, operating parameters of the aircraft such as flight altitude, flight speed, external pressure, temperature, fuel level, course, angle of inclination, rudder and flap positions, engine information and similar parameters. Furthermore, flight data may include media recordings in general, for example voice recordings of the pilot and/or the co-pilot in the cockpit, video recordings of the cockpit, voice recordings of the radio communications with base stations, other aircraft or tower staff of an airport, sound recordings of acoustic interference messages, video recordings of the display elements in the cockpit, announcements of the flight attendant crew in the passenger compartment and similar media data files.

Figure 1:
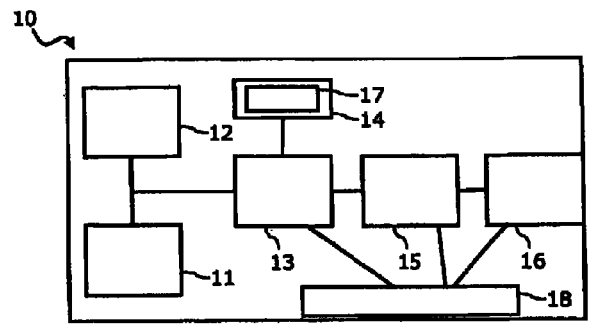
FIG. 1 shows a schematic illustration of a flight recorder according to an embodiment of the invention.

FIG. 1 shows a schematic illustration of a flight recorder 10. The flight recorder 10 comprises a memory 14, for example a flash memory, a hard disc, a memory card or a similar data storage system. The memory 14 may, in particular, be rewritable and have a database structure 17, in which flight data can be stored in structured form. For example, the flight data can be stored in table form, in which the type of flight data can be organised in columns of the table and the time sequence of the flight data recording can be organised in lines of the table.

The memory 14 is coupled to a control device 13, which is configured to record flight data during the flight of an aircraft and to store them in the memory 14. For this purpose, the flight recorder 10, on the one hand, may have a flight data collector 11, which is configured to collect operating parameters of the flight during the flight and to transfer them to the control device 13. On the other hand, the flight recorder 10 may have a media collecting apparatus 12, which is configured to collect media recordings during the flight of the aircraft and to transfer them to the control device 13. The control device 13 can filter the collected data of the two apparatuses in a suitable manner and store them on the memory 14 in structured form.

The control device 13 may, for example, comprise a microprocessor, a microcontroller, an ASIC or a similar arithmetic unit. Furthermore, the flight recorder comprises a transceiver device 15 such as, for example, a modem unit, which is coupled to the control device 13. The control device 13 can transfer data as transmitting signals to the transceiver device 15, which can then be transmitted outwardly by the transceiver device 15. Conversely, the transceiver device 15 can receive signals and forward them as control signals to the control device 13. The control device 13 can, in particular, read out flight data signals from the memory 14, which flight data signals are converted by the transceiver device 15 into acoustic signals. The transceiver device 15 may, for example, also be configured integrally with the control device 13, in other words, the control device 13 and the transceiver device 15 are integrated in a common arithmetic device, which takes on both the control functions of the control device 13 and the modem functions of the transceiver device 15.

The acoustic signals are transferred to an acoustic transducer 16 of the flight recorder 10, which is configured to emit the acoustic signals of the transceiver device 15 into a body of water, for example into the sea or ocean if the flight recorder 10 is underwater. The acoustic transducer 16 can also be configured to output a homing signal, which can be used, in particular, to locate the position of the flight recorder 10 after the aircraft has crashed. The homing signal may, for example, be helpful during the recovery of the flight recorder 10 after a crash.

Not shown in FIG. 1 are optional sensors such as salt content sensors, pressure sensors or water sensors, which are configured to check the environmental parameters of the flight recorder 10, so the control device 13 can ascertain whether the flight recorder 10 is underwater or not.

In the case of an aircraft crash and the flight recorder 10 subsequently sinking to the bottom of a body of water, control signals can be transmitted to the transceiver device 15, which control signals are passed by the latter to the control device 13, so the control device 13, depending on the control signals, can retrieve partial data areas of the stored flight data from the memory 14 and can transfer them to the transceiver device 15 for transmission by the acoustic transducer 16.

In particular, it is possible to predetermine by means of an external data read-out system of the control device 13, which part of the flight data the control device 13 should transmit outwardly by means of the transceiver device 15 for reception by the data read-out system. As a result, the data quantity transmitted by the flight recorder 10 can be substantially reduced, as individual items of flight data can be retrieved in a targeted manner from the flight recorder 10 via the control signals.

It is particularly advantageous here to carry out a sequential selection of the flight data to be transmitted: for example, the data read-out system can firstly retrieve the voice data of the last five minutes before the crash from the cockpit. After evaluating these voice data, an indication can possibly already be obtained as to what the possible causes of the crash could be, for example a failure of the elevators. Thereupon, by means of a further control signal, the control device 13 can be instructed to retrieve the operating parameters of the elevators from the memory 14 and to only transmit these flight data to the data read-out system.

A substantial advantage of this functionality is that the necessary power or energy requirement of the flight recorder 10 can be reduced, as to transmit only a fraction of the flight data, substantially less electrical energy is consumed by the flight recorder 10. The flight recorder 10 may have an electrical energy supply source 18, for example a lithium-ion battery, which is configured to supply the control device 13, the transceiver device 15, the acoustic transducer 16 and optionally further components of the flight recorder 10 with electrical energy. On the one hand, smaller batteries having a smaller system weight may thus be installed, without endangering the functionality of the flight recorder 10. On the other hand, with the same battery power, a longer time availability of the flight recorder 10 or a higher range of the data transmission to the surface of the body of water can optionally be ensured.

In order to save further energy, the control device 13 may be configured to be operated in an energy-saving state until a control signal puts the control device 13 into a normal operating state. Only in the normal operating state can the control device 13 transfer flight data signals to the transceiver device 15. On the other hand, in the energy-saving state, the control device 13 is operated at low power, so the battery capacity of the electrical energy supply source lasts substantially longer.

Figure 2:
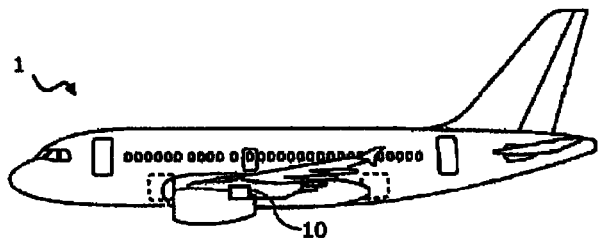
FIG. 2 shows a schematic illustration of an aircraft having a flight recorder according to a further embodiment of the invention.

FIG. 2 shows a schematic illustration of an aircraft 1 having a flight recorder 10. The aircraft 1 in this case has structural components, which can be used as a housing for the flight recorder 10. It is particularly advantageous here that the flight recorder 10 does not itself have to be equipped with its own housing, which can save costs, installation space and system weight.

The prerequisites for a structural component of the aircraft 1 to qualify as a housing for the flight recorder 10 are high mechanical stability, i.e. crash resistance, heat resistance, i.e. fire resistance, and water pressure resistance. Structural components, which generally satisfy these prerequisites, are metal components, for example made of titanium, which already satisfy the prerequisites because of their actual function. For example, structural components of this type may be undercarriage housings, engine mountings (pylons) or similar aircraft components.

Figure 3:
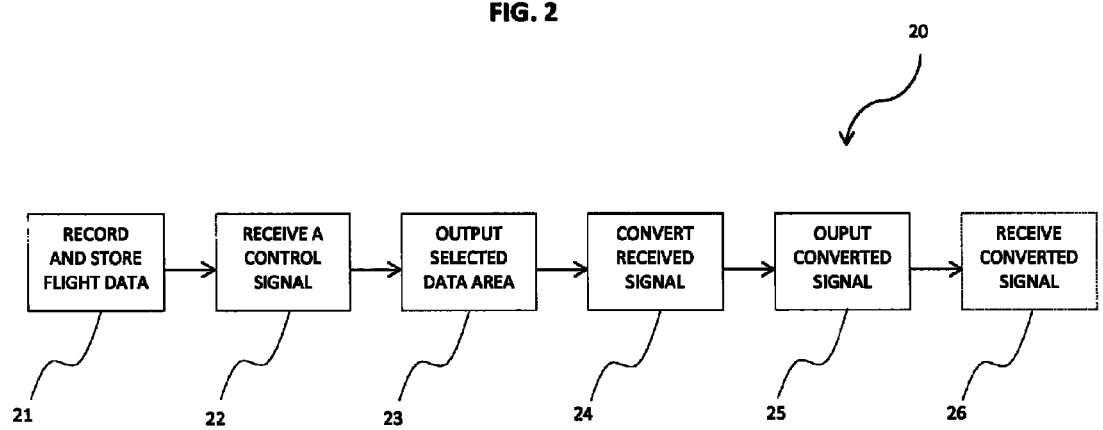
FIG. 3 shows a schematic illustration of a method for reading out flight data from a flight recorder according to a further embodiment of the invention.

FIG. 3 shows a schematic illustration of a method 20 for reading out flight data of a flight recorder in an aircraft, for example a flight recorder 10 in an aircraft 1 as shown in conjunction with FIGS. 1 and 2. The method 20 can, for example, be used after an aircraft crash, in which the aircraft wreck together with the flight recorder 10 has sunk to the bottom of a body of water, for example an ocean or sea.

The method 20 comprises, as the first step 21, recording of flight data during the flight of the aircraft 1 and storing the flight data in the memory 14 of a flight recorder 10. Thereafter, in a second step 22, a control signal can be received, which activates a control device 13 of the flight recorder 10 to output a selected partial data area of the stored flight data.

The control signal may, for example, be transmitted by a data read-out system 4 to the flight recorder 10. In this case, the data read-out system 4 may be incorporated, for example, in an underwater vehicle 3, in the part of a ship 2 located underwater or in a part of a floating buoy 6 located underwater.

The selected partial data area can then be output in step 23 by the control device 13 to a transceiver device 15 of the flight recorder 10 as a flight data signal, which, in step 24, converts the received flight data signal into acoustic signals, which can in turn be output into a body of water in step 25, for example by an acoustic transducer 16.

The converted acoustic signals can be received in an optional step 26 for further processing and evaluation by the data read-out system 4 located at least partly in the body of water. In the case of a floating buoy 6, which incorporates the data read-out system 4, a communications device 7, which is intended to forward the flight data received by the data read-out system 4 to a satellite communications system 8, can furthermore be provided in the floating buoy 6. In the case of the reception of the flight data by a data read-out system 4 of a ship 2 or an underwater vehicle 3 lowered by a ship 2, the flight data can be evaluated directly on board the ship 2. Obviously, it may alternatively also be possible to provide on board the ship 2 a communications device that forwards the flight data to a satellite communications system 8, so the flight data can be evaluated in a base station or a command centre.

The control device 13 can be operated in an energy-saving state until a corresponding control signal is received, for example by a data read-out system 4, which puts the control device 13 into a normal operating state. The energy-saving state may, for example, be a sleep mode, in which the control device 13 or the entire flight recorder 10 consumes as little energy as possible, for example by limiting the possible functionality of the control device 13 to only the most necessary operations. In contrast, the normal operating state may be an operating state, in which the control device 13 has a full or virtually full functionality range. For example, the control device 13 can output flight data signals to the transceiver device 15 only in the normal operating state.

Figure 4:
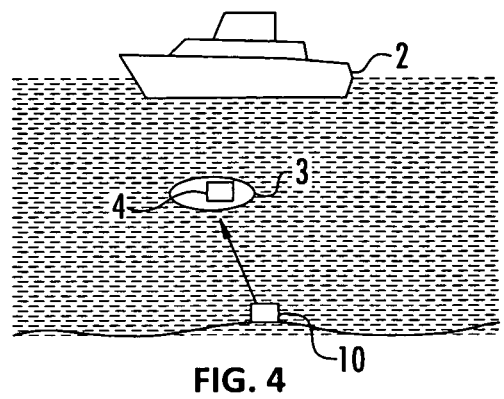
FIG. 4 shows a schematic illustration of an exemplary read-out process of flight data from a flight recorder by a read-out system according to a further embodiment of the invention.
Figure 5:
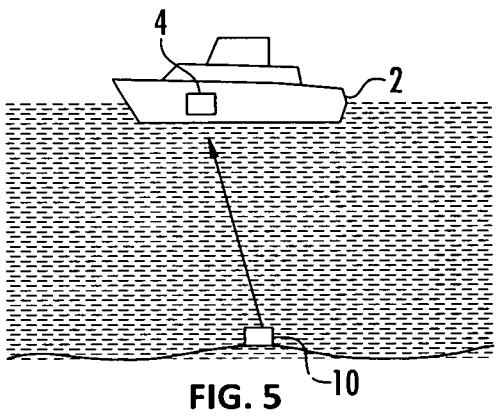
FIG. 5 shows a schematic illustration of a further exemplary read-out process of flight data from a flight recorder by a read-out system according to a further embodiment of the invention.
Figure 6:
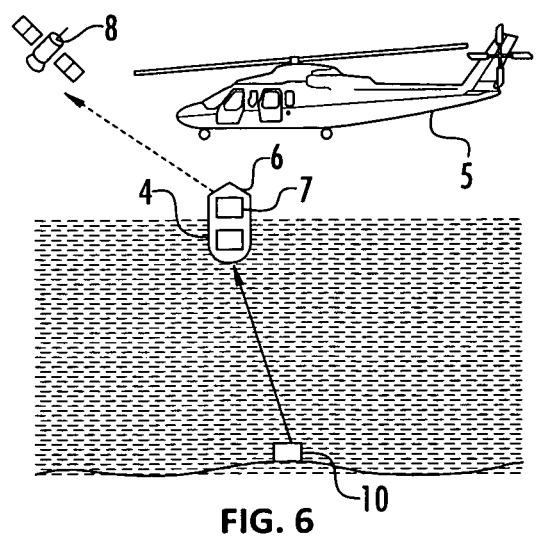
FIG. 6 shows a schematic illustration of a further exemplary read-out process of flight data from a flight recorder by a read-out system according to a further embodiment of the invention.

FIGS. 4, 5 and 6 show three exemplary scenarios as to how flight data can be read out from a flight recorder 10 of an aircraft wreck that has sunk to the bottom of a body of water. In FIG. 4, after an aircraft crash, a ship 2 can approach the position on the surface of the body of water, for example a sea or ocean, at which the aircraft has crashed into the body of water. For example, this position may have been notified to the ship 2 by an emergency locator transmitter (ELT) of the aircraft. An underwater vehicle 3 with a data read-out system 4 can be lowered into the body of water from the ship 2, said underwater vehicle then being able to follow a homing signal of the emergency system of the aircraft until the underwater vehicle 3 arrives within the range of the flight recorder 10. Alternatively, the underwater vehicle 3 can also follow sonar signals of the ship 2, which scan the bottom of the body of water.

The further away the underwater vehicle 3 is from the flight recorder 10, the more energy will be required to transmit flight data from the flight recorder 10 to the data read-out system 4 of the underwater vehicle 3. For example, the distance which the underwater vehicle 3 has to cover to arrive at the flight recorder 10 may be between one and several kilometers. A typical value for the maximum possible distance that can be bridged by the flight recorder 10 is about eight kilometers.

If the flight recorder 10 does not lie further away from the surface of the body of water than a first threshold value distance, for example two kilometers, the use of an underwater vehicle 3 can be dispensed with. This scenario is shown in FIG. 5: in this case, the ship 2 itself has the data read-out system 4, which is situated in a part of the ship 2 located underwater. The ship 2 can then be vertically, or virtually vertically, above the position of the flight recorder 10 on the bottom of the body of water and read out the flight data of the flight recorder 10 by means of the ship's own data read-out system 4.

Finally, it may also be possible—as shown in FIG. 6—to send a helicopter 5 or a locating aircraft to the position above the surface of the body of water, under which the flight recorder 10 is suspected to be. The helicopter 5 can drop a floating buoy 6 into the body of water. In addition to the data read-out system 4, which is arranged in the part of the floating buoy 6 located underwater, this buoy also has a communications device 7, which can communicate data to a satellite communications system 8 in order to forward flight data received by the data read-out system 4 from the flight recorder 10 to the satellite communications system 8 and from there onward to a base station or command centre for processing and evaluation.

What is claimed is:

1. A flight recorder, comprising:
a memory;
a control device, which is coupled to the memory and which is configured to record flight data during the flight of an aircraft and to store said flight data in the memory;
a transceiver device, which is coupled to the control device and which is configured to accept stored flight data signals from the control device and to convert them into acoustic signals; and
an acoustic transducer, which is coupled to the transceiver device and which is configured to emit the acoustic signals of the transceiver device into a body of water, the control device being configured to receive control signals via the transceiver device and, depending on the control signals, to retrieve partial data areas of the stored flight data from the memory and to transfer them to the transceiver device;
wherein the control device is configured to be operated in an energy-saving state until a control signal puts the control device into a normal operating state, the control device being configured to transfer flight data signals to the transceiver device only in the normal operating state.

2. The flight recorder according to claim 1, further comprising:
a flight data collector, which is configured to collect operating parameters of the aircraft during the flight and to transfer them to the control device.

3. The flight recorder according to claim 2, further comprising:
a media collecting apparatus, which is configured to collect media recordings during the flight of the aircraft and to transfer them to the control device.

4. The flight recorder according to claim 1, wherein the memory has a database structure, which is configured to store the flight data in structured form.

5. The flight recorder according to claim 1, further comprising:
an electrical energy supply source, which is configured to supply the control device, the transceiver device and/or the acoustic transducer with electrical energy.

6. An aircraft, having a flight recorder according to claim 1.

7. The aircraft according to claim 6, wherein the aircraft has an engine mounting, which is used as a housing for the flight recorder.

8. The aircraft according to claim 6, wherein the aircraft has an undercarriage housing, which is used as a housing for the flight recorder.

9. A method for reading out flight data from a flight recorder, comprising:
recording flight data during the flight of the aircraft and storing the flight data in a memory of a flight recorder;
receiving a control signal, which activates a control device of the flight recorder to output a selected partial data area of the stored flight data;

outputting the selected partial data area of the stored flight data by the control device to a transceiver device as a flight data signal;

converting the received flight data signals by the transceiver device into acoustic signals; and outputting the converted acoustic signals of the transceiver device into a body of water.

10. The method according to claim 9, further comprising:
receiving the converted acoustic signals by a data read-out system located in the body of water.

11. The method according to claim 10, wherein the data read-out system is incorporated in an underwater vehicle, in the part of a ship located underwater or in a part of a floating buoy located underwater.

12. The method according to claim 11, wherein the floating buoy has a communications device for forwarding the flight data received by the data read-out system to a satellite communications system.

13. The method according to claim 9, wherein the control device is operated in an energy-saving state until a control signal puts the control device into a normal operating state.

14. The method according to claim 13, wherein the control device outputs flight data signals to the transceiver device only in the normal operating state.

\* \* \* \* \*